(12) United States Patent
Hashimoto et al.

(10) Patent No.: US 8,930,053 B2
(45) Date of Patent: Jan. 6, 2015

(54) CONTROL APPARATUS FOR HYBRID VEHICLE

(71) Applicants: Toshiya Hashimoto, Miyoshi (JP); Hideaki Yaguchi, Toyota (JP)

(72) Inventors: Toshiya Hashimoto, Miyoshi (JP); Hideaki Yaguchi, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 86 days.

(21) Appl. No.: 13/707,222

(22) Filed: Dec. 6, 2012

(65) Prior Publication Data

US 2013/0151053 A1    Jun. 13, 2013

(30) Foreign Application Priority Data

Dec. 9, 2011  (JP) ................................. 2011-270412

(51) Int. Cl.
| | |
|---|---|
| *B60L 9/00* | (2006.01) |
| *G06F 19/00* | (2011.01) |
| *B60W 20/00* | (2006.01) |
| *B60W 10/06* | (2006.01) |
| *B60W 10/08* | (2006.01) |

(52) U.S. Cl.
CPC ............. *B60W 20/108* (2013.01); *B60W 10/06* (2013.01); *B60W 10/08* (2013.01); *B60W 20/50* (2013.01); *B60W 2710/0644* (2013.01); *Y10S 903/93* (2013.01); *Y02T 10/7077* (2013.03); *Y02T 10/6286* (2013.01); *Y02T 10/6239* (2013.01); *B60W 2540/10* (2013.01); *B60W 2540/12* (2013.01); *B60W 2710/0661* (2013.01); *B60W 2710/0672* (2013.01); *B60W 2710/1055* (2013.01); *Y10S 903/903* (2013.01)

USPC ............ 701/22; 180/65.265; 701/90; 701/93; 701/101; 701/103; 701/115; 903/930; 903/903; 903/930

(58) Field of Classification Search
CPC ... B60W 10/06; B60W 10/08; B60W 20/108; B60W 2710/0644; B60W 20/50; B60W 2710/0661; B60W 2710/0672; B60W 2710/1055; B60W 2540/10; B60W 2540/12; Y10S 903/93; Y02T 10/6239; Y02T 10/6286; Y02T 10/7077
USPC ....................... 701/22, 90, 93, 101, 103, 115; 180/65.265; 903/903, 930
See application file for complete search history.

(56) References Cited

U.S. PATENT DOCUMENTS

| | | | | |
|---|---|---|---|---|
| 5,280,223 | A * | 1/1994 | Grabowski et al. | 318/139 |
| 5,842,534 | A * | 12/1998 | Frank | 180/65.25 |
| 6,302,823 | B1 * | 10/2001 | Eckert et al. | 477/186 |
| 6,480,779 | B2 * | 11/2002 | Mardberg | 701/70 |
| 6,493,622 | B1 * | 12/2002 | Erban | 701/84 |
| 6,892,128 | B2 * | 5/2005 | Asakawa et al. | 701/103 |

(Continued)

FOREIGN PATENT DOCUMENTS

| | | | |
|---|---|---|---|
| JP | 2003267076 A | * | 9/2003 |
| JP | 2010-038051 A | | 2/2010 |
| WO | WO 2013084357 A1 | * | 6/2013 |

*Primary Examiner* — Calvin Cheung
*Assistant Examiner* — Angelina Shudy
(74) *Attorney, Agent, or Firm* — Gifford, Krass, Sprinkle, Anderson & Citkowski, P.C.

(57) ABSTRACT

A control apparatus for a hybrid vehicle includes, as a drive power source, a hybrid system that has an engine and a motor. The control apparatus includes a control unit configured to reduce an output of the hybrid system and maintain or increase an engine rotation speed when a driver performs an accelerator operation and a brake operation simultaneously.

10 Claims, 7 Drawing Sheets

(56) References Cited

U.S. PATENT DOCUMENTS

| | | |
|---|---|---|
| 8,428,845 B2* | 4/2013 | Miyazaki et al. .............. 701/101 |
| 2007/0219703 A1* | 9/2007 | Wagner et al. ................ 701/103 |
| 2008/0228369 A1* | 9/2008 | Stroh et al. ...................... 701/84 |
| 2010/0036566 A1 | 2/2010 | Hayami |
| 2010/0113221 A1* | 5/2010 | Roberts ......................... 477/175 |
| 2010/0138090 A1* | 6/2010 | Jinno et al. ..................... 701/22 |
| 2010/0222973 A1* | 9/2010 | Senda et al. .................... 701/54 |
| 2011/0029172 A1* | 2/2011 | Kwon et al. ..................... 701/22 |
| 2011/0264354 A1* | 10/2011 | Debs et al. .................... 701/103 |
| 2011/0295480 A1* | 12/2011 | Shimada et al. ................ 701/70 |
| 2012/0271526 A1* | 10/2012 | Oishi et al. ...................... 701/99 |
| 2013/0151110 A1* | 6/2013 | Hashimoto et al. ............. 701/99 |
| 2013/0157806 A1* | 6/2013 | Koyama et al. .................. 477/5 |
| 2014/0038774 A1* | 2/2014 | Kida et al. ...................... 477/96 |
| 2014/0095045 A1* | 4/2014 | Takagi et al. ................... 701/70 |

* cited by examiner

CONTROL APPARATUS FOR HYBRID VEHICLE

INCORPORATION BY REFERENCE

The disclosure of Japanese Patent Application No. 2011-270412 filed on Dec. 9, 2011 including the specification, drawings and abstract is incorporated herein by reference in its entirety.

BACKGROUND OF THE INVENTION

1. Field of the Invention

The invention relates to a control apparatus for a hybrid vehicle having, as a drive power source, a hybrid system (HVS) that includes an engine and a motor.

2. Description of Related Art

A brake override system (BOS) such as that described in Japanese Patent Application Publication No. 2010-038051 (JP-2010-038051 A) is available as a control system applied to a vehicle. In the BOS described in JP-2010-038051 A, when an accelerator operation (accelerator pedal depression) and a brake operation (brake pedal depression) are performed simultaneously, an engine output is reduced by throttling a throttle valve to reduce a driving force of the vehicle so that vehicle braking based on the brake operation is prioritized over vehicle acceleration based on the accelerator operation.

Incidentally, in a vehicle driving technique for improving a reacceleration ability after exiting a curve, the brake pedal is depressed while keeping the accelerator pedal depressed before the curve so that the vehicle is decelerated while suppressing a reduction in an engine rotation speed. In a vehicle employing the BOS described above, the BOS is activated by this simultaneous depression of the accelerator pedal and the brake pedal and the throttle valve is throttled, so that the engine rotation speed decreases even when the vehicle is decelerated while keeping the accelerator pedal depressed.

If the engine rotation speed is decreased, even when the engine output is increased in order to reaccelerate after disabling the BOS operation, the increased output is used to increase the engine rotation speed, and therefore an increase in engine torque is delayed. Hence, in a vehicle employing a BOS, the reacceleration ability required by a driver after exiting a curve cannot be secured sufficiently even when the driving technique described above is performed, and as a result, drivability deteriorates.

SUMMARY OF THE INVENTION

The invention provides a control apparatus for a hybrid vehicle, with which deterioration of drivability can be suppressed favorably.

A first aspect of the invention is a control apparatus for a hybrid vehicle including, as a drive power source, a hybrid system (HVS) that has an engine and a motor, the control apparatus having a control unit configured to reduce an output of the hybrid system and maintain or increase an engine rotation speed when a driver performs an accelerator operation and a brake operation simultaneously.

According to the above configuration, the engine rotation speed is maintained or increased when the output of the HVS is reduced due to the simultaneous performance of an accelerator operation and a brake operation. Therefore, reacceleration of the vehicle after terminating the output reduction operation starts from a condition in which the engine rotation speed is maintained or increased. Hence, the engine torque can be increased quickly during reacceleration, and as a result, deterioration of the reacceleration ability of the vehicle can be suppressed. According to the above configuration, therefore, deterioration of the drivability can be suppressed favorably.

A second aspect of the invention is a control apparatus for a hybrid vehicle including, as a drive power source, an HVS that has an engine and a motor, the control apparatus having a control unit configured to reduce an output of the hybrid system and maintain or increase a speed ratio of the engine to a drive wheel of the hybrid vehicle when a driver performs an accelerator operation and a brake operation simultaneously.

When the speed ratio of the engine to the drive wheel is controlled in accordance with a reduction in the output of the HVS resulting from simultaneous performance of an accelerator operation and a brake operation, the speed ratio decreases in accordance with the reduction in the engine output, and as a result, the engine rotation speed decreases. According to the above configuration, however, the speed ratio is maintained when the output is reduced in response to simultaneous performance of an accelerator operation and a brake operation, and as a result, a reduction in the engine rotation speed accompanying the output reduction is suppressed. Hence, reacceleration of the vehicle after terminating the output reduction operation starts from a comparatively high engine rotation speed. Therefore, the engine torque can be increased quickly during reacceleration, and as a result, deterioration of the reacceleration ability of the vehicle can be suppressed. According to the above configuration, therefore, deterioration of the drivability can be suppressed favorably.

A third aspect of the invention is a control apparatus for a hybrid vehicle including, as a drive power source, an HVS that has an engine and a motor, the control apparatus having a control unit configured to perform output reduction control that reduces an output of the hybrid system by only changing a parameter other than a target engine rotation speed when a driver performs an accelerator operation and a brake operation simultaneously.

According to the above configuration, reduction of the output of the HVS is performed by changing a parameter(s) other than the target engine rotation speed when the output of the HVS is reduced due to the simultaneous performance of an accelerator operation and a brake operation. Therefore, reacceleration of the vehicle after terminating the output reduction operation starts from a condition in which the engine rotation speed is higher than that in the case where the output of the HVS is reduced by changing parameters including the target engine rotation speed. Hence, an engine torque can be increased quickly during reacceleration, and as a result, deterioration of a reacceleration ability of the vehicle can be suppressed. According to the above configuration, therefore, deterioration of the drivability can be suppressed favorably.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Embodiment

A first embodiment of a control apparatus for a hybrid vehicle according to the invention will be described in detail below with reference to FIGS. 1 to 5.

First, referring to FIG. 1, a configuration of a hybrid system (HVS) of the hybrid vehicle to which the control apparatus according to this embodiment is applied will be described. The HVS includes an engine 1 serving as a heat engine, and two motor/generators. Of the two motor/generators, a motor/generator that is used mainly to generate power will be referred to hereafter as a generator 2, while a motor/generator that is used mainly to generate driving force will be referred to as a motor 3.

The engine 1, the generator 2, and the motor 3 are connected to a power distribution mechanism 4 including a planetary gear mechanism. Further, the power distribution mechanism 4 is connected to drive wheels 6 via a reduction mechanism 5. The power distribution mechanism 4 divides power of the engine 1 into power for driving the generator 2 and power for driving the drive wheels 6.

A relationship between rotation speeds of the engine 1, the generator 2, and the drive wheels 6, which are coupled via the power distribution mechanism 4 as described above, always takes the form of a connected straight line on an alignment chart illustrating a rotation condition of the planetary gear of the power distribution mechanism 4. Therefore, in this HVS, a speed ratio of the engine 1 to the drive wheels 6, or in other words a ratio of the rotation speed of the drive wheels 6 to the rotation speed of the engine 1, is changed by changing the rotation speed of the generator 2.

The HVS further includes a power control unit 7 having a boost converter and an inverter. The boost converter boosts a voltage of a hybrid battery 8 to a voltage required to drive the generator 2 and the motor 3. The inverter converts a high-voltage direct current boosted by the boost converter into an alternating current to be supplied to the generator 2 and the motor 3, and when the generator 2 and the motor 3 function as power generators, the inverter converts an alternating current generated by the generator 2 and the motor 3 into a direct current.

The HVS thus configured is controlled by an electronic control unit 9. The electronic control unit 9 includes a central processing unit (CPU) that performs calculation processing relating to various types of control performed on the HVS, a read-only memory (ROM) that stores programs and data to be used in the control, and a random access memory (RAM) that temporarily stores calculation results from the CPU, detection results from sensors, and so on.

Detection signals from sensors provided in respective parts of the hybrid vehicle are input into the electronic control unit 9. These sensors include an accelerator position sensor 10, a master cylinder pressure sensor 11, a vehicle speed sensor 12, a battery temperature sensor 13, a battery voltage sensor 14, a battery current sensor 15, a motor temperature sensor 16, and so on. The accelerator position sensor 10 detects a depression amount (an accelerator operation amount) of an accelerator pedal 10a, while the master cylinder pressure sensor 11 detects a master cylinder pressure generated in accordance with depression of a brake pedal 11a. The vehicle speed sensor 12 detects a vehicle speed of the hybrid vehicle. The battery temperature sensor 13, the battery voltage sensor 14, and the battery current sensor 15 respectively detect a temperature, a voltage, and a current value of the hybrid battery 8. The motor temperature sensor 16 detects a temperature of the motor 3.

Further, a drive mode switching switch 17 for setting a drive mode of the hybrid vehicle is connected to the electronic control unit 9. This hybrid vehicle is set to one of three drive modes, namely an economy drive mode in which fuel efficiency is prioritized, a sport drive mode in which acceleration is prioritized, and a normal drive mode between the economy drive mode and the sport drive mode, by operating the drive mode switching switch 17.

The electronic control unit 9 controls the driving force of the hybrid vehicle by calculating outputs of the engine 1 and the motor 3 corresponding to an operating condition of the hybrid vehicle on the basis of the detection results from the sensors and transmitting output requests thereto. Next, this driving force control performed on the hybrid vehicle will be described in detail.

Figure 2:
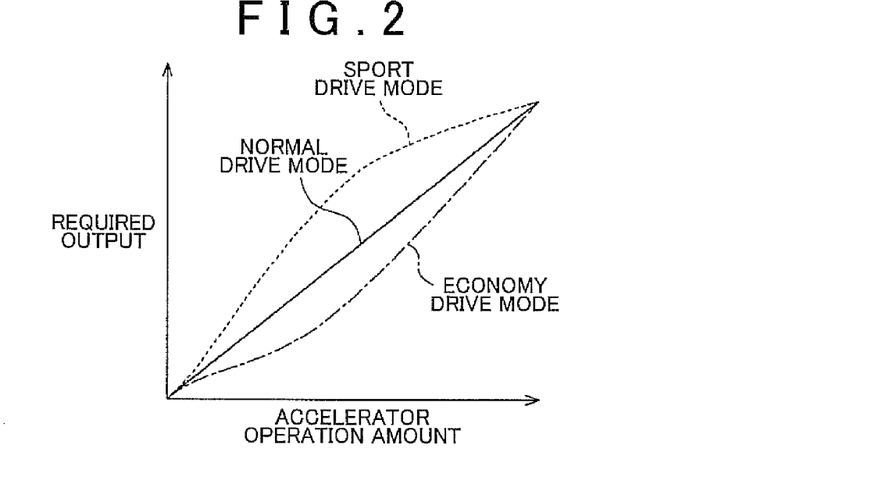
FIG. 2 is a graph showing relationships between required output and accelerator operation amount in respective drive modes of the hybrid vehicle, to which the first embodiment is applied.

During the driving force control, first, the electronic control unit 9 calculates, as a required output, a magnitude of an output of the HVS required by the driver, on the basis of the accelerator operation amount detected by the accelerator position sensor 10 and the vehicle speed detected by the vehicle speed sensor 12. Note that a relationship between the accelerator operation amount and the required output at an identical vehicle speed in each drive mode of the hybrid vehicle is as shown in FIG. 2. As shown in FIG. 2, the required output at an identical accelerator operation amount is larger in the sport drive mode than in the normal drive mode and the economy drive mode.

Further, the electronic control unit 9 calculates a state of charge (SOC) value of the hybrid battery 8 on the basis of the detection signals from the battery temperature sensor 13, the battery voltage sensor 14, and the battery current sensor 15. The electronic control unit 9 then calculates a required total output, which is a required value of the output of the HVS (to be referred to hereafter as an HVS output), on the basis of the required output and the SOC value. Note that the HVS output is a sum of the output of the engine 1, the output of the generator 2, and the output of the motor 3, and represents an amount of power transmitted from the power distribution mechanism 4 to the reduction mechanism 5. Incidentally, during power generation by the generator 2 and the motor 3, the HVS output is calculated assuming that the outputs of the generator 2 and the motor 3 are negative values whose absolute value is equal to the amount of power used for the power generation.

Next, the electronic control unit 9 calculates a target engine rotation speed and a required engine output on the basis of the required total output, and issues a corresponding command to the engine 1. In the engine 1, engine control such as fuel injection control and ignition timing control is performed in response to the command so that an engine output corresponding to the required engine output and an engine rotation speed corresponding to the target engine rotation speed are obtained.

Further, the electronic control unit 9 calculates a torque required by the driver corresponding to a travel condition of the hybrid vehicle. The required torque is an output torque of the HVS required to obtain an HVS output corresponding to the required total output at a current vehicle speed.

The electronic control unit 9 then calculates respective torque command values for the generator 2 and the motor 3 on the basis of the torque required by the driver and an engine torque determined from the required engine output and the target engine rotation speed. The electronic control unit 9 then transmits the calculated torque command values for the generator 2 and the motor 3 to the power control unit 7. Note that the torque command values are respectively set at positive values when the generator 2 and the motor 3 perform a power running operation and at negative values when the generator 2 and the motor 3 perform a regenerative operation. The power control unit 7 controls respective driving alternating currents or power generation alternating currents of the generator 2 and the motor 3 in response to the commands so that torques corresponding to the torque command values are output.

The HVS also employs a brake override system (BOS) that prioritizes vehicle braking based on depression of the brake pedal 11*a* (a brake operation) over vehicle acceleration based on depression of the accelerator pedal 10*a* (an accelerator operation). Next, the BOS will be described in detail.

Figure 3:
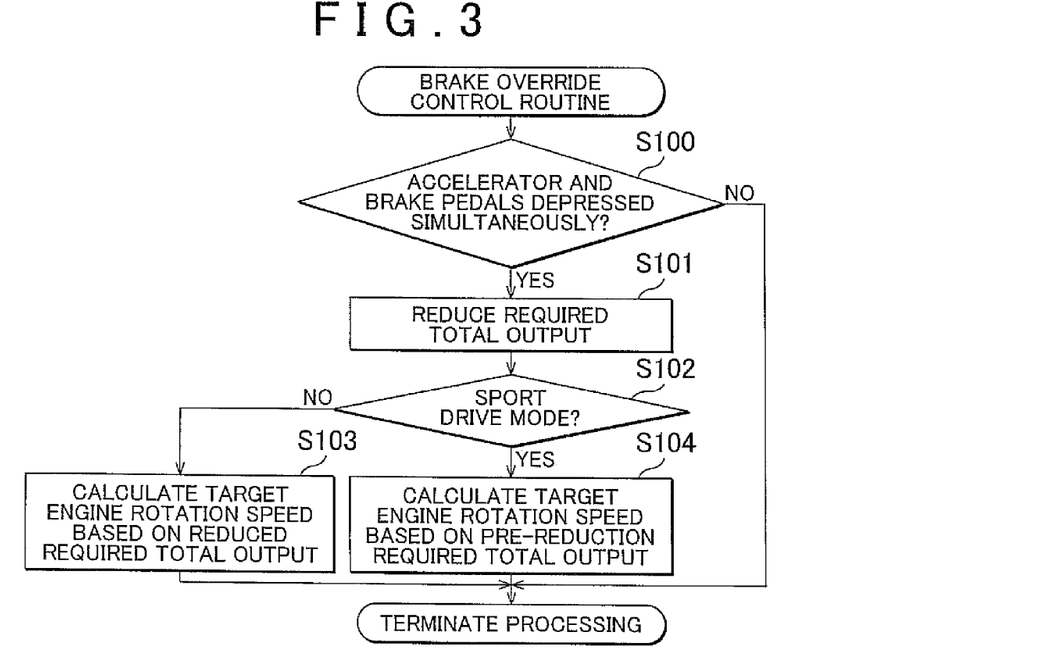
FIG. 3 is a flowchart showing a processing procedure of a brake override control routine employed in the first embodiment.

In the control apparatus for a hybrid vehicle according to this embodiment, the BOS is realized by processing of a brake override control routine shown in FIG. 3. The processing of this routine is executed repeatedly by the electronic control unit 9 in a prescribed control cycle while the hybrid vehicle travels.

First, in Step S100 at the start of the processing of the routine, a determination is made as to whether or not the accelerator pedal 10*a* and the brake pedal 11*a* are depressed simultaneously, or in other words whether the driver is performing an accelerator operation and a brake operation simultaneously. Here, when simultaneous depression is not underway (S100: NO), the processing of the current routine is terminated.

When simultaneous depression is underway (S100: YES), on the other hand, the processing advances to Step S101, and in Step S101, the required total output is reduced. More specifically, the required total output calculated on the basis of the required output and the SOC value is reset to a smaller value.

Next, in Step S102, a determination is made as to whether or not the hybrid vehicle is in the sport drive mode. Here, when the hybrid vehicle is in the sport drive mode (S102: YES), the processing advances to Step S104, and when the hybrid vehicle is not in the sport drive mode (S102: NO), the processing advances to Step S103.

When the processing advances to Step S103, the target engine rotation speed is calculated in Step S103 on the basis of the required total output reduced in Step S101, whereupon the processing of the current routine is terminated. Hence, in this case, the target engine rotation speed is reduced in accordance with the simultaneous depression of the accelerator pedal 10*a* and the brake pedal 11*a*. Note that the required engine output in this case is calculated from the reduced required total output. The respective torque command values of the generator 2 and the motor 3 are then calculated on the basis of an engine torque determined from the target engine rotation speed and required engine output thus calculated, and a required torque corresponding to the reduced required total output.

When the processing advances to Step S104, on the other hand, the target engine rotation speed is calculated on the basis of the pre-reduction required total output of Step S101 in Step S104, whereupon the processing of the current routine is terminated. Note that the required engine output in this case is calculated on the basis of the reduced required total output. The respective torque command values of the generator 2 and the motor 3 are then calculated on the basis of an engine torque determined from the calculated target engine rotation speed and required engine output, and a required torque corresponding to the reduced required total output. Hence, the target engine rotation speed in this case is calculated on the basis of the pre-reduction required total output, so that the target engine rotation speed is maintained even when the accelerator pedal 10*a* and the brake pedal 11*a* are depressed simultaneously. The torque command value of the generator 2, meanwhile, is set so that the generator 2 rotates at a rotation speed required for the rotation speed of the engine 1 to reach a value corresponding to the target engine rotation speed. Therefore, in this case, the speed ratio of the engine 1 to the drive wheels 6 is maintained even when the accelerator pedal 10*a* and the brake pedal 11*a* are depressed simultaneously.

Next, a control operation performed during an operation of the BOS of the control apparatus for a hybrid vehicle according to this embodiment will be described. First, a case in which the HVS output is reduced during the BOS operation without maintaining the engine rotation speed will be described with reference to FIG. 4. When, at a time t1, an accelerator operation and a brake operation are performed simultaneously, the BOS is activated, whereby the required engine output is reduced. In this case, the target engine rotation speed is reduced simultaneously. Hence, in this case, an actual engine rotation speed is reduced in accordance with a reduction in an actual engine output resulting from the BOS operation. Further, the speed ratio of the engine 1 to the drive wheels 6 is reduced as the actual engine rotation speed decreases.

Figure 4:
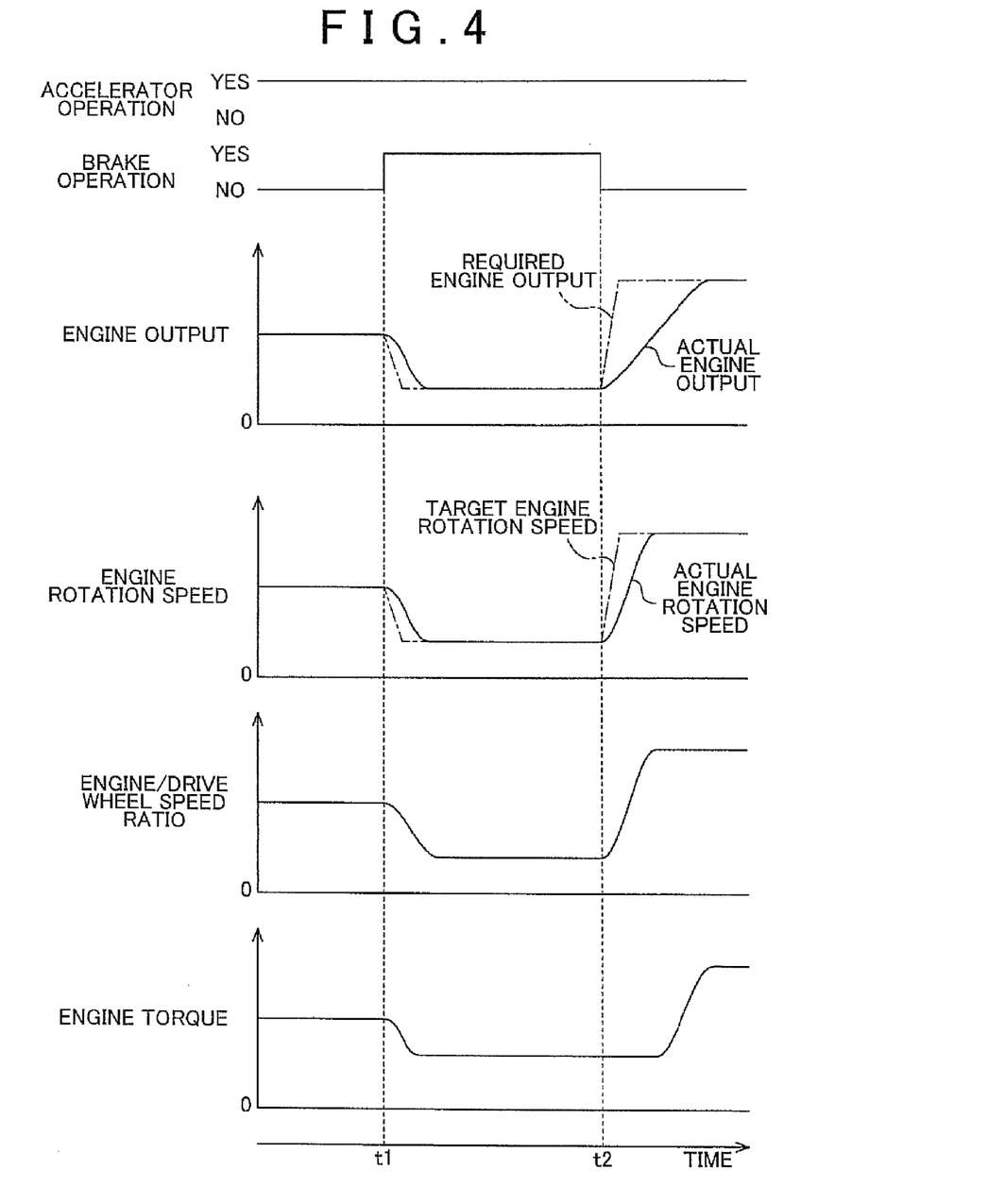
FIG. 4 is a time chart showing an example of control performed during a BOS operation in which a HVS output is reduced without maintaining an engine rotation speed.

When, at a time t2, depression of the brake pedal 11*a* is released and depression of the accelerator pedal 10*a* is increased, the BOS is disabled and the required engine output is increased. Accordingly, the target engine rotation speed is also increased. The actual engine output is then increased in accordance with the increase in the required engine output. In this case, however, the actual engine rotation speed reduced during the operation of the BOS is increased to a value corresponding to the target rotation speed, and therefore the engine torque does not increase quickly despite the increase in the actual engine output. As a result, an increase in the engine torque is delayed.

Figure 5:
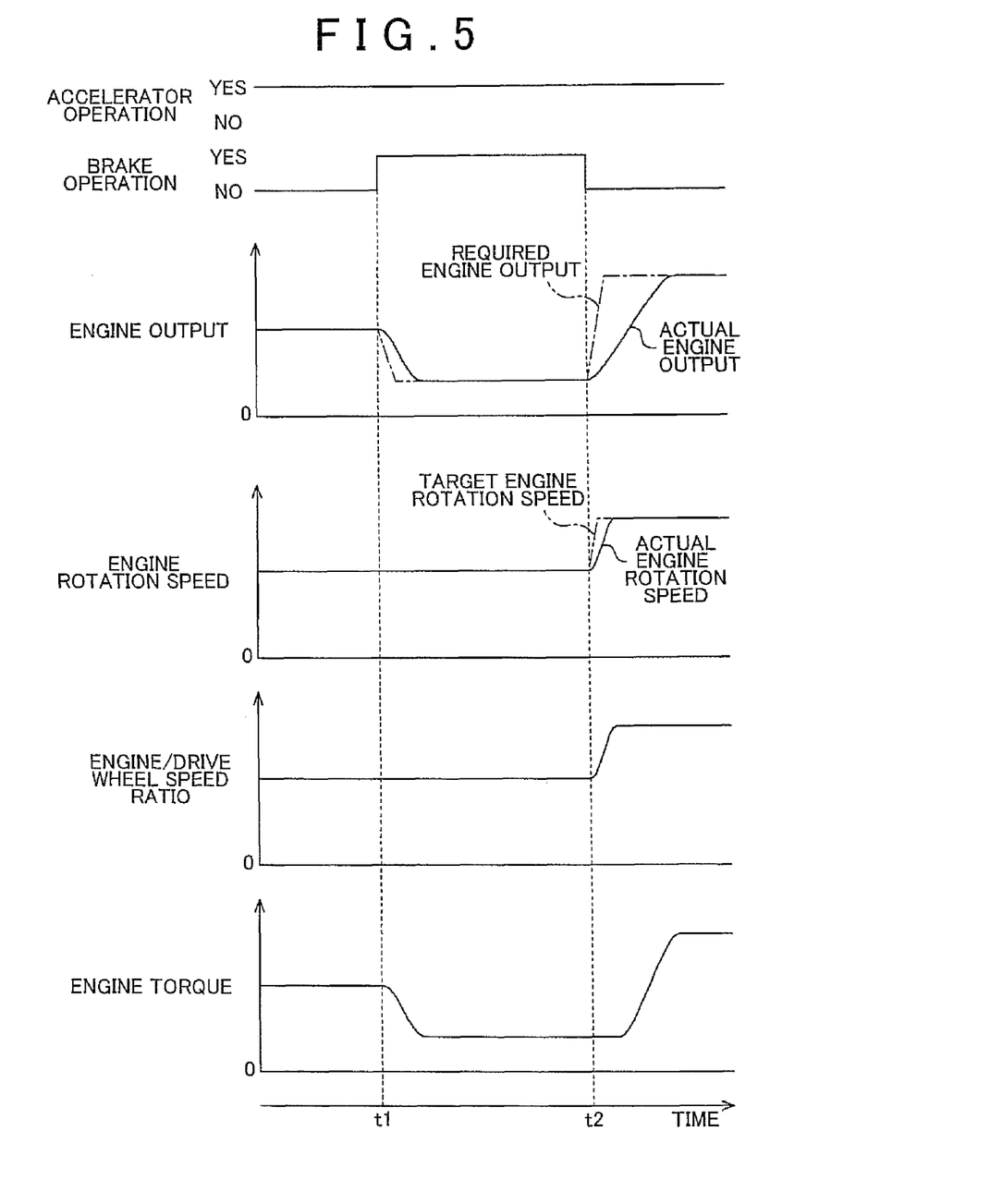
FIG. 5 is a time chart showing an example of control performed during a BOS operation according to the first embodiment.

In this embodiment, on the other hand, as shown in FIG. 5, when the BOS is activated at the time t1, the required engine output is reduced but the target engine rotation speed is maintained at a current value. Hence, during the BUS operation, the engine rotation speed is not reduced and the speed ratio of the engine 1 to the drive wheels 6 is likewise maintained at a current value. Therefore, when the BOS is disabled at the time t2, the actual engine rotation speed immediately increases to the value corresponding to the target engine rotation speed. As a result, the engine torque starts to increase at an earlier stage after disabling the BOS.

With the control apparatus for a hybrid vehicle according to the embodiment described above, the following effects are obtained. (1) In this embodiment, the engine rotation speed and the speed ratio of the engine 1 to the drive wheels 6 are maintained when the HVS output is reduced by the BOS operation. Hence, the engine rotation speed is not reduced during the BOS operation, so that the need to increase the engine rotation speed greatly when the BOS is disabled is eliminated, and as a result, the engine torque can be increased quickly in accordance with the increase in the engine output after disabling the BOS. Therefore, a delay in the increase in the engine torque after disabling the BOS can be suppressed, and as a result, deterioration of drivability can be suppressed favorably.

(2) In this embodiment, the engine rotation speed and the speed ratio are maintained during the BOS operation on condition that the hybrid vehicle is in the sport drive mode. The driver sets the hybrid vehicle to the sport drive mode when a high acceleration performance is required, and therefore, when the hybrid vehicle is in the sport drive mode, deterioration of a reacceleration ability caused by the BOS operation leads to deterioration of the drivability. Hence, by maintaining the engine rotation speed and the speed ratio during the BUS operation only when the hybrid vehicle is in the sport drive mode, deterioration of the drivability can be suppressed effectively and efficiently.

(3) When the engine rotation speed decreases as a result of the BOS operation, the driver may feel uncomfortable because of a reduction in the engine rotation speed despite the fact that depression of the accelerator pedal 10a has not been reduced. Further, the driver perceives an approximate amount by which the accelerator pedal 10a is depressed from the engine rotation speed and engine noise, and therefore, when the engine rotation speed is reduced by the BUS operation, the driver may think that the depression amount of the accelerator pedal 10a is smaller than an actual amount. In this embodiment, however, the engine rotation speed does not decrease during the BOS operation. Therefore, the aforementioned uncomfortable feeling can be avoided, and the depression amount of the accelerator pedal 10a can be perceived appropriately also during the BOS operation.

Second Embodiment

Next, a second embodiment of the control apparatus for a hybrid vehicle according to the invention will be described in detail with additional reference to FIGS. 6 and 7. Note that in this embodiment, configurations common with the above embodiment have been indicated by identical reference symbols, and detailed description thereof has been omitted.

In the first embodiment, a delay in the engine torque increase after disabling the BOS is suppressed by maintaining the engine rotation speed and the speed ratio during the BOS operation. In this embodiment, the engine rotation speed is increased in advance during the BOS operation in preparation for reacceleration of the hybrid vehicle after disabling the BOS. By so doing, the engine torque can be increased even more quickly during reacceleration.

Figure 6:
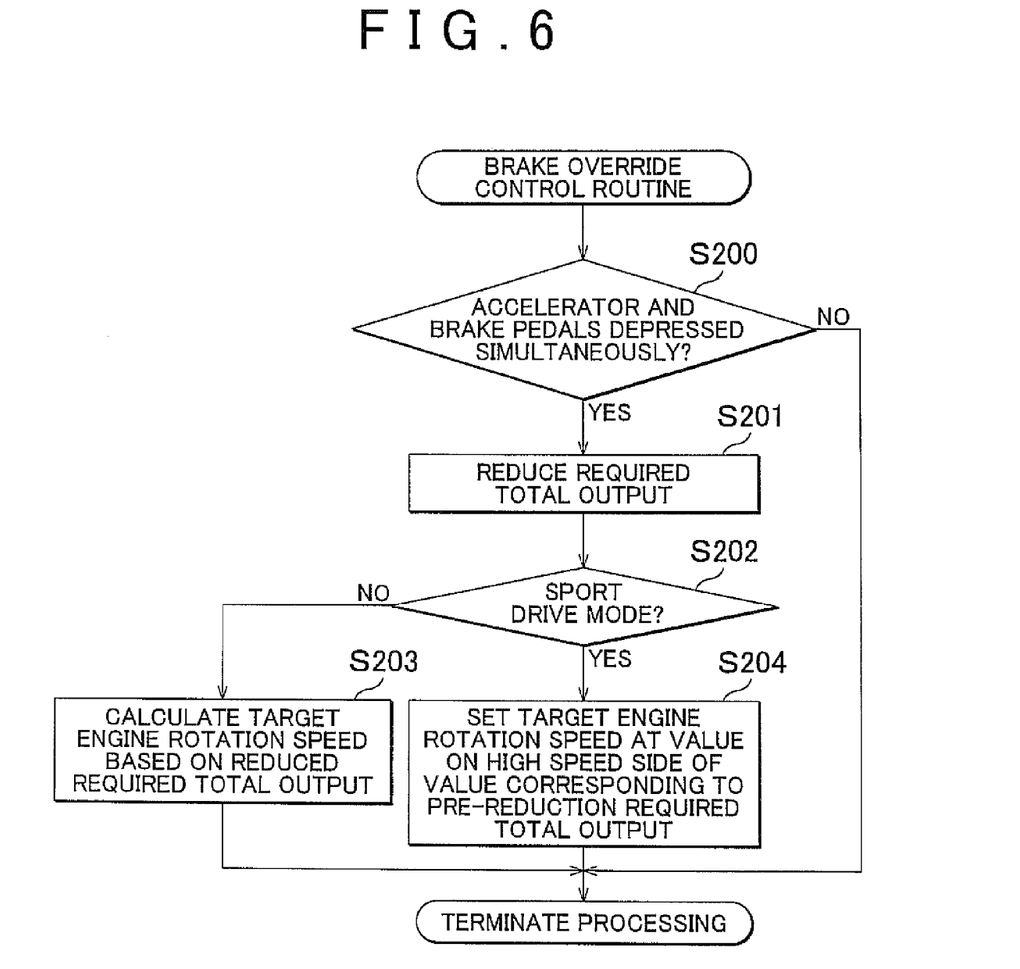
FIG. 6 is a flowchart showing a processing procedure of a brake override control routine employed in a second embodiment of the control apparatus for a hybrid vehicle according to the invention.
Figure 7:
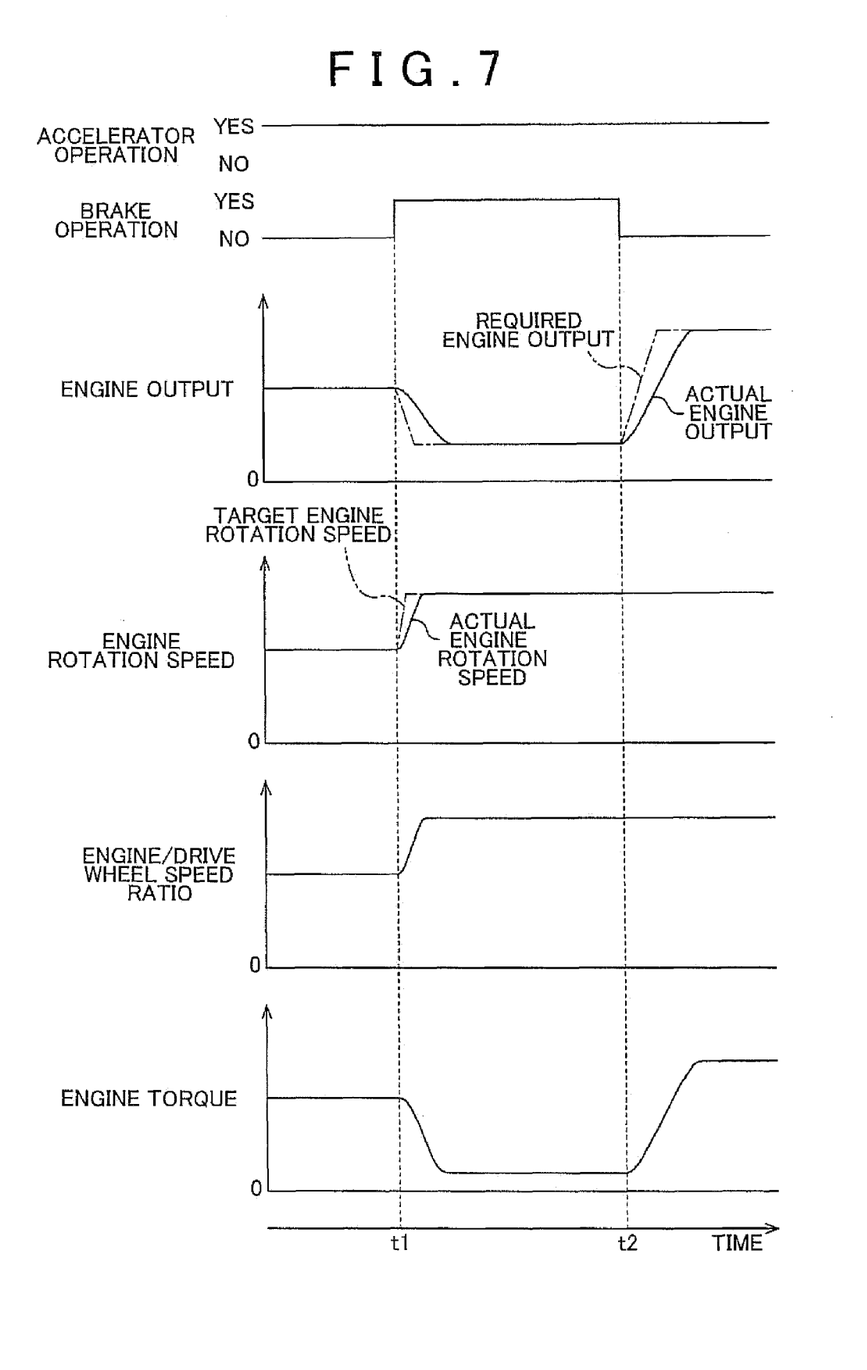
FIG. 7 is a time chart showing an example of control performed during a BOS operation according to the second embodiment.

In the control apparatus for a hybrid vehicle according to this embodiment, the BOS is realized by processing of a brake override control routine shown in FIG. 6. The processing of this routine is executed repeatedly by the electronic control unit 9 in a prescribed control cycle while the hybrid vehicle travels.

First, in Step S200 at the start of the processing of the routine, a determination is made as to whether or not the accelerator pedal 10a and the brake pedal 11a are depressed simultaneously, or in other words whether the driver is performing an accelerator operation and a brake operation simultaneously. Here, when simultaneous depression is not underway (S200: NO), the processing of the current routine is terminated.

When simultaneous depression is underway (S200: YES), on the other hand, the processing advances to Step S201, and in Step S201, the required total output is reduced. More specifically, the required total output calculated on the basis of the required output and the SOC value is reset to a smaller value.

Next, in Step S202, a determination is made as to whether or not the hybrid vehicle is in the sport drive mode. Here, when the hybrid vehicle is in the sport drive mode (S202: YES), the processing advances to Step S204, and when the hybrid vehicle is not in the sport drive mode (S202: NO), the processing advances to Step S203.

When the processing advances to Step S203, the target engine rotation speed is calculated in Step S203 on the basis of the required total output reduced in Step S201, whereupon the processing of the current routine is terminated. Hence, in this case, the target engine rotation speed is reduced in accordance with the simultaneous depression of the accelerator pedal 10a and the brake pedal 11a. Note that the required engine output in this case is calculated from the reduced required total output. The respective torque command values of the generator 2 and the motor 3 are then calculated on the basis of an engine torque determined from the target engine rotation speed and required engine output thus calculated, and a required torque corresponding to the reduced required total output.

When the processing advances to Step S204, on the other hand, the target engine rotation speed is set in Step S204 at a value on a high speed side of a value corresponding to the pre-reduction required total output, whereupon the processing of the current routine is terminated. Note that the required engine output in this case is calculated on the basis of the reduced required total output. The respective torque command values of the generator 2 and the motor 3 are then calculated on the basis of an engine torque determined from the target engine rotation speed and required engine output thus calculated, and a required torque corresponding to the reduced required total output. Hence, when the accelerator pedal 10a and the brake pedal 11a are depressed simultaneously in this case, the target engine rotation speed is increased. The torque command value of the generator 2, meanwhile, is set so that the generator 2 rotates at a rotation speed required for the rotation speed of the engine 1 to reach a value corresponding to the target engine rotation speed. Therefore, when the accelerator pedal 10a and the brake pedal 11a are depressed simultaneously in this case, the speed ratio of the engine 1 to the drive wheels 6 is also increased.

Next, a control operation performed during an operation of the BOS of the control apparatus for a hybrid vehicle according to this embodiment will be described with reference to FIG. 7. When, at a time t1, an accelerator operation and a brake operation are performed simultaneously, the BOS is activated, whereby the required engine output is reduced. Conversely, meanwhile, the target engine rotation speed is increased. Hence, in this embodiment, the engine rotation speed is increased when the actual engine output is reduced as a result of the BOS operation. Further, the speed ratio of the engine 1 to the drive wheels 6 is increased as the actual engine rotation speed increases.

When, at a time t2, depression of the brake pedal 11a is released and depression of the accelerator pedal 10a is increased, the BOS is disabled and the required engine output is increased. In this case, the target engine rotation speed is set at a higher value corresponding to the increased required engine output. Note, however, that in this embodiment, the actual engine rotation speed is increased in advance during the BOS operation, and therefore substantially no increase of the actual engine rotation speed is needed after disabling the BOS. Hence, the engine torque increases quickly in accordance with the increase in the engine output after disabling the BOS.

With the control apparatus for a hybrid vehicle according to the embodiment described above, following effects are obtained. (4) In this embodiment, the engine rotation speed is increased while the HVS output is reduced by the BOS operation. Likewise, the speed ratio of the engine 1 to the drive wheels 6 is increased while the HVS output is reduced by the BOS operation. Hence, during the BOS operation, the engine rotation speed is increased in advance in preparation for reacceleration, so that the need to increase the engine rotation speed greatly after disabling the BOS is eliminated, and as a result, the engine torque can be increased quickly in accordance with the increase in the engine output after disabling the BOS. Therefore, a delay in the engine torque increase after disabling the BOS can be suppressed, and as a result, deterioration of the drivability can be suppressed favorably.

(5) In this embodiment, the engine rotation speed and the speed ratio are increased during the BOS operation on condition that the hybrid vehicle is in the sport drive mode. The driver sets the hybrid vehicle to the sport drive mode when a high acceleration performance is required, and therefore, when the hybrid vehicle is in the sport drive mode, deterioration of the reacceleration ability caused by the BOS operation leads to deterioration of the drivability. Hence, by increasing the engine rotation speed and the speed ratio during the BOS operation only when the hybrid vehicle is in the sport drive mode, deterioration of the drivability can be suppressed effectively and efficiently.

Third Embodiment

Next, a third embodiment of the control apparatus for a hybrid vehicle according to the invention will be described in detail with additional reference to FIG. 8.

In the above embodiments, deterioration of the reacceleration ability of the hybrid vehicle after disabling the BOS is suppressed by maintaining or increasing the engine rotation speed despite the reduction in engine output occurring during the BOS operation. In this embodiment, by reducing the HVS output during the BOS operation through torque control of the motor 3 alone and maintaining the engine output during the BOS operation, a reduction in the engine rotation speed during the BOS operation is avoided, whereby deterioration of the reacceleration ability of the hybrid vehicle after disabling the BOS is suppressed.

When the HVS output is reduced during the BOS operation through torque control of the motor 3 alone, a load on the motor 3 and the hybrid battery 8 that supplies power to the motor 3 increases. Hence, in this embodiment, the HVS output is not reduced during the BOS operation through torque control of the motor 3 alone when the load on the motor 3 and the hybrid battery 8 is large.

Figure 8:
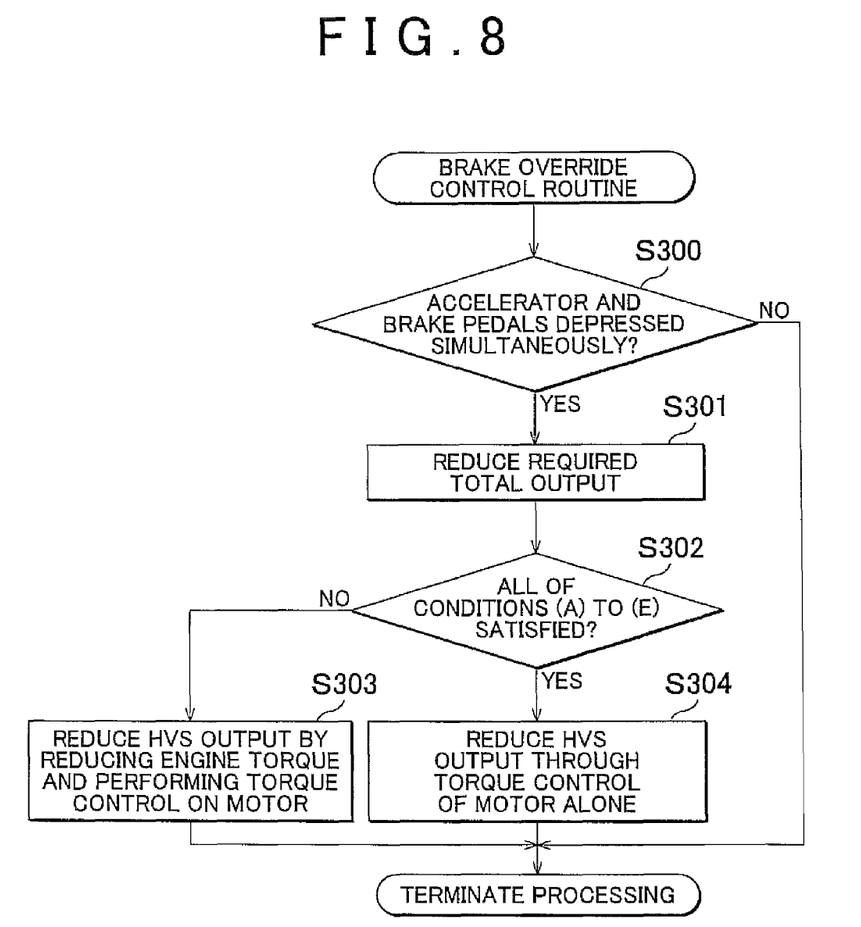
FIG. 8 is a flowchart showing a processing procedure of a brake override control routine employed in a third embodiment of the control apparatus for a hybrid vehicle according to the invention.

In this embodiment, the BUS is implemented by processing of a brake override control routine shown in FIG. 8. The processing of this routine is executed repeatedly by the electronic control unit 9 in a prescribed control cycle while the hybrid vehicle travels.

First, in Step S300 at the start of the processing of the routine, a determination is made as to whether or not the accelerator pedal 10a and the brake pedal 11a are depressed simultaneously. Here, when the accelerator pedal 10a and the brake pedal 11a are not depressed simultaneously (S300: NO), the processing of the current routine is terminated.

When the accelerator pedal 10a and the brake pedal 11a are depressed simultaneously (S300: YES), on the other hand, the required total output is reduced in Step S301. More specifically, the required total output in this case is reset to a smaller value than the value calculated on the basis of the current required output and SOC value.

Next, in Step S302, a determination is made as to whether or not following Conditions (A) to (E) are all satisfied. Note that Conditions (A) to (D) are conditions for determining whether or not a margin exists in the load on the motor 3 and the hybrid battery 8, and when at least one of these conditions is not satisfied, this means that the load on at least one of the motor 3 and the hybrid battery 8 is large. (A) The temperature of the hybrid battery 8 is equal to or lower than a threshold. (B) The voltage of the hybrid battery 8 is equal to or lower than a threshold. (C) The SOC value of the hybrid battery 8 is equal to or lower than a threshold. (D) The temperature of the motor 3 is equal to or lower than a threshold. (E) The hybrid vehicle is in the sport drive mode.

When at least one of Conditions (A) to (E) is not satisfied (S302: NO), the HVS output is reduced by reducing the engine torque and performing torque control on the motor 3 in Step S303, whereupon the processing of the current routine is terminated. In other words, in this case, the electronic control unit 9 calculates the required engine output and the target engine rotation speed on the basis of the required total output reduced in Step S301. Further, the electronic control unit 9 calculates the respective torque command values of the generator 2 and the motor 3 on the basis of an engine torque determined from the required engine output and target engine rotation speed calculated herein, and a required torque corresponding to the required total output reduced in Step S301.

When all of Conditions (A) to (E) are satisfied (S302: YES), on the other hand, the HVS output is reduced through torque control of the motor 3 alone in Step S304, whereupon the processing of the current routine is terminated. In other words, in this case, the electronic control unit 9 calculates the required engine output and the target engine rotation speed on the basis of the required total output prior to the reduction in Step S301. Further, the electronic control unit 9 calculates the respective torque command values of the generator 2 and the motor 3 on the basis of an engine torque determined from the required engine output and target engine rotation speed calculated herein, and a required torque corresponding to the required total output reduced in Step S301.

Next, a control operation performed during an operation of the BOS of the control apparatus for a hybrid vehicle according to this embodiment will be described. In this embodiment, when an accelerator operation and a brake operation are performed simultaneously and the BOS is activated, the required total output is reduced. Here, when at least one of Conditions (A) to (E) is not satisfied, the engine output and the motor output are reduced in accordance with the reduction in the required total output. Further, the engine rotation speed is also reduced in accordance with the reduction in the engine output in this case, and the speed ratio of the engine 1 to the drive wheels 6 is reduced accordingly. In this case, the reduced engine rotation speed must be greatly increased after disabling the BOS. Thus, the increase in engine output after disabling the BOS is used to increase the engine rotation speed, which results in a delay in the engine torque increase.

When all of Conditions (A) to (E) are satisfied during the BOS operation, on the other hand, although the motor output is reduced in accordance with the reduction in the required total output due to the BOS operation, the engine output is maintained. Therefore, the engine rotation speed is not reduced by the BOS operation, and the speed ratio of the engine 1 to the drive wheels 6 is also maintained. Since, also in this case, the engine rotation speed is not reduced during the BOS operation, there is no need to increase the engine rotation speed greatly after disabling the BOS. Hence, the increased engine output after disabling the BUS can be spent on increasing the engine torque from an early stage, and as a result, the engine torque can be increased earlier.

With the control apparatus for a hybrid vehicle according to the embodiment described above, the following effects are obtained. (6) In this embodiment, when all of Conditions (A) to (E) are satisfied, the HVS output is reduced through torque control of the motor 3 alone during the BOS operation. Accordingly, both the engine rotation speed and the speed ratio of the engine 1 to the drive wheels 6 are maintained during the BOS operation. Hence, there is no need to increase the engine rotation speed greatly after disabling the BOS, and therefore the engine torque can be increased quickly as the engine output is increased after disabling the BOS. A delay in the engine torque increase after disabling the BOS can therefore be suppressed, and as a result, deterioration of the drivability can be suppressed favorably.

(7) In this embodiment, the HVS output is reduced through torque control of the motor 3 alone during the BOS operation on condition that the hybrid vehicle is in the sport drive mode. The driver sets the hybrid vehicle to the sport drive mode when a high acceleration performance is required, and therefore, when the hybrid vehicle is in the sport drive mode, deterioration of the reacceleration ability due to the BOS operation leads to deterioration of the drivability. Hence, by reducing the HVS output through torque control of the motor 3 alone only when the hybrid vehicle is in the sport drive mode, deterioration of the drivability can be suppressed effectively and efficiently.

(8) In this embodiment, the HVS output is not reduced through torque control of the motor 3 alone during the BOS operation when the load on the motor 3 and the hybrid battery 8 is large. As a result, the load on the motor 3 and the hybrid battery 8 can be suppressed favorably.

The embodiments described above may be implemented after being modified as follows.

In the above embodiments, the acceleration performance of the vehicle in the sport drive mode is improved by increasing the required output at an identical accelerator operation amount. However, the acceleration performance in the sport drive mode may be improved using another method. For example, the acceleration performance of the vehicle can be enhanced beyond a normal level by modifying a shift map such that when the hybrid vehicle is in the sport drive mode, the speed ratio of the engine 1 to the drive wheels 6 is reduced at an identical vehicle speed.

In a vehicle employing a traction control system, when wheel spinning is confirmed from the vehicle speed, rotation speeds of respective vehicle wheels, and so on, the wheel spinning is eliminated by reducing the output of the drive power source (the engine or the like) in order to reduce the driving force transmitted to the drive wheels. In a vehicle employing this type of traction control system, a situation can occur, in which, even when the driver forcefully depresses the accelerator pedal 10a, the traction control system is activated and as a result, the output does not increase. Therefore, in some cases, a traction control system disabling switch is provided so that the traction control system can be disabled when the driver requires a high acceleration performance. When, in this type of vehicle, the output is not reduced by the operation of the traction control system, the acceleration performance of the vehicle increases correspondingly, and therefore, by disabling the traction control system, the acceleration performance of the vehicle can be enhanced beyond a normal level. Hence, disabling a traction control system in this manner also corresponds to setting the hybrid vehicle to a drive mode, in which the acceleration performance of the hybrid vehicle is enhanced beyond a normal level, according to the invention.

In the above embodiments, the engine rotation speed and the speed ratio are maintained or increased during the BOS operation on condition that the hybrid vehicle is in a drive mode, in which the acceleration performance of the hybrid vehicle is enhanced beyond a normal level, such as the sport drive mode. However, the engine rotation speed and the speed ratio may be maintained or increased during the BOS operation regardless of the setting of the drive mode when deterioration of the reacceleration ability after disabling the BOS will pose a problem or the like.

In the third embodiment, whether the load on the motor 3 and the hybrid battery 8 is large is determined from the temperature of the motor 3 and the temperature, voltage, and SOC value of the hybrid battery 8. However, this determination may be made using other parameters.

In the first embodiment, the engine rotation speed and the speed ratio may be maintained during the BOS operation on condition that the load on the motor 3 and the hybrid battery 8 is not large. By allowing the engine rotation speed to decrease during the BOS operation when the load is large, a situation in which a load on the motor 3 and the hybrid battery 8 is increased in order to maintain the engine rotation speed and the speed ratio can be prevented.

In the second embodiment, the engine rotation speed and the speed ratio may be increased during the BOS operation on condition that the load on the motor 3 and the hybrid battery 8 is not large. By allowing the engine rotation speed to decrease during the BOS operation when the load is large, a situation in which the load on the motor 3 and the hybrid battery 8 is increased in order to increase the engine rotation speed and the speed ratio can be prevented.

In the above embodiments, the speed ratio of the engine 1 to the drive wheels 6 is determined from the relationship between the rotation speeds of the respective gears constituting the planetary gear mechanism of the power distribution mechanism 4. However, the invention may also be applied to a hybrid vehicle including a stepped or continuously variable automatic transmission. A shift operation of an automatic transmission is typically performed on the basis of the vehicle speed and the drive power source output, and therefore the automatic transmission may be upshifted in response to the reduction in the HVS output resulting from the BOS operation. By prohibiting the upshift or forcibly downshifting the transmission in response to the BOS operation, the speed ratio of the engine 1 to the drive wheels 6 can be maintained or increased during the BOS operation. By so doing, a reduction in the engine rotation speed during the BOS operation can be avoided or suppressed, and as a result, a delay in the engine torque increase after disabling the BOS can be suppressed, that is, deterioration of the drivability can be suppressed.

Figure 1:
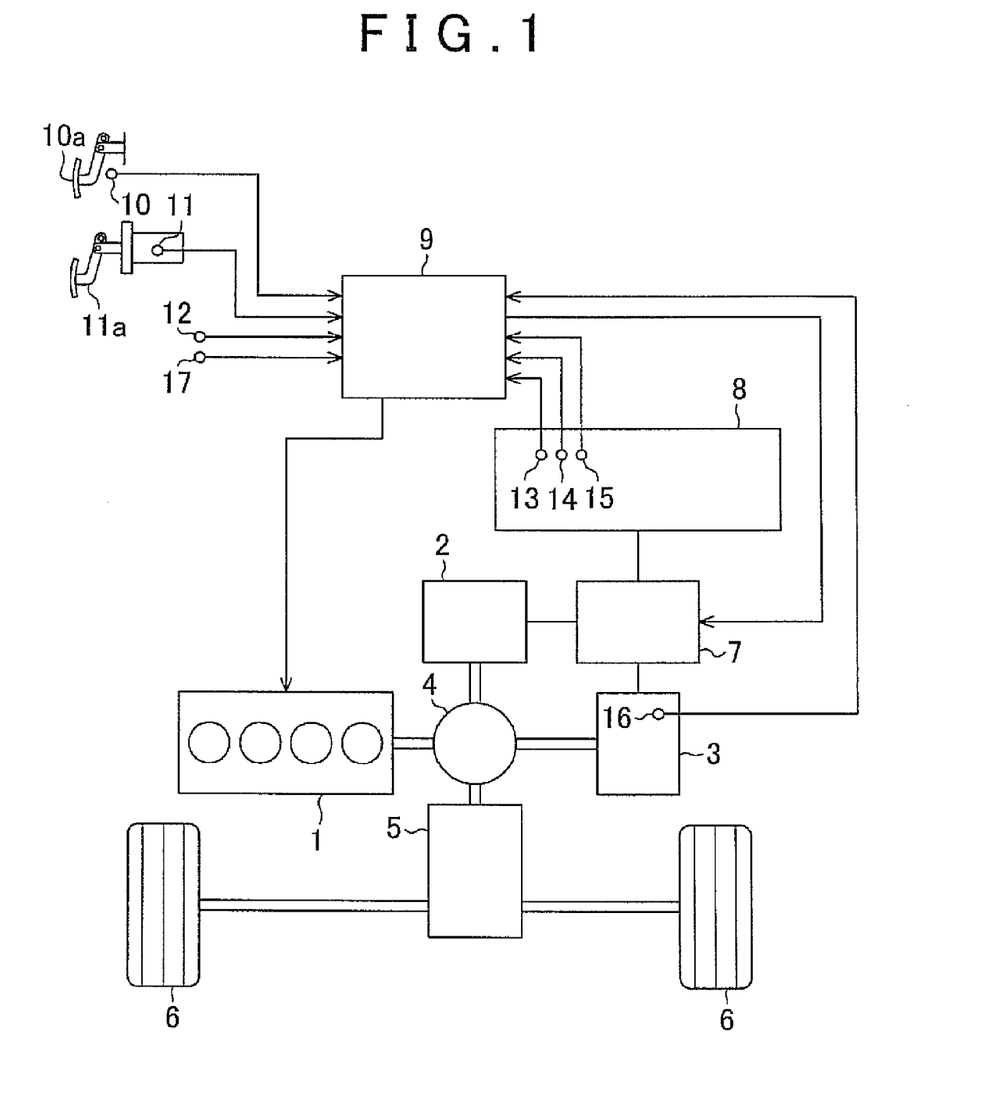
FIG. 1 is a schematic diagram showing a configuration of an HVS for a hybrid vehicle, to which a first embodiment of a control apparatus for a hybrid vehicle according to the invention is applied.

The invention may also be applied to a hybrid vehicle having an HVS configured differently to that of FIG. 1 as a drive power source in similar or equivalent embodiments to those described above.

The control unit may be configured to reduce the engine rotation speed when the driver performs an accelerator operation and a brake operation simultaneously, provided that the hybrid vehicle is not in a drive mode, in which an acceleration performance of the hybrid vehicle is enhanced beyond a normal level.

In certain hybrid vehicles, a drive characteristic of the vehicle may be modified by switching drive modes. Accordingly, when the driver requires a high acceleration ability, a drive mode, in which the acceleration performance of the vehicle is enhanced beyond a normal level, can be selected. When the driver does not require a high acceleration performance, on the other hand, it is considered that the driver rarely feels dissatisfaction in relation to deterioration of the reacceleration ability as described above. Therefore, even if the engine rotation speed and the speed ratio are maintained or increased during an output reduction such as that described above only when the hybrid vehicle is in the drive mode, in which the acceleration performance of the vehicle is enhanced beyond a normal level, deterioration of the drivability can likewise be suppressed.

The control unit may be configured to reduce the engine rotation speed when the driver performs an accelerator operation and a brake operation simultaneously, provided that a load on the motor and a battery that supplies power to the motor is large.

To maintain or increase the engine rotation speed and the speed ratio during an output reduction such as that described above, the engine rotation speed must be adjusted using the motor or the like, which lead to an increase in the load on the motor and the battery that supplies power to the motor. Therefore, when the load on the motor and the battery is large, the engine rotation speed and the speed ratio are preferably not maintained or increased during an output reduction such as that described above.

The invention has been described with reference to example embodiments for illustrative purposes only. It should be understood that the description is not intended to be exhaustive or to limit form of the invention and that the invention may be adapted for use in other systems and applications. The scope of the invention embraces various modifications and equivalent arrangements that may be conceived by one skilled in the art.

What is claimed is:

1. A control apparatus for a hybrid vehicle including, as a drive power source, a hybrid system that has an engine and a motor, the control apparatus comprising
    an electronic control unit configured to reduce an output of the hybrid system and maintain or increase an engine rotation speed when a driver performs an accelerator operation and a brake operation simultaneously while the hybrid vehicle is in motion.

2. The control apparatus for a hybrid vehicle according to claim 1, wherein
    the electronic control unit is configured to reduce the engine rotation speed when the driver performs an accelerator operation and a brake operation simultaneously, provided that the hybrid vehicle is not in a sport drive mode in which an acceleration performance of the hybrid vehicle is enhanced beyond a drive mode other than the sport drive mode.

3. The control apparatus for a hybrid vehicle according to claim 1, wherein
    the electronic control unit is configured to reduce the engine rotation speed when the driver performs an accelerator operation and a brake operation simultaneously, provided that a parameter which reflects the load on the motor and a battery is larger than a threshold.

4. A control apparatus for a hybrid vehicle including, as a drive power source, a hybrid system that has an engine and a motor, the control apparatus comprising
    an electronic control unit configured to reduce an output of the hybrid system and maintain or increase a speed ratio of the engine to a drive wheel of the hybrid vehicle when a driver performs an accelerator operation and a brake operation simultaneously while the hybrid vehicle is in motion.

5. The control apparatus for a hybrid vehicle according to claim 4, wherein
    the electronic control unit is configured to reduce the engine rotation speed when the driver performs an accelerator operation and a brake operation simultaneously, provided that the hybrid vehicle is not in a sport drive mode in which an acceleration performance of the hybrid vehicle is enhanced beyond a drive mode other than the sport drive mode.

6. The control apparatus for a hybrid vehicle according to claim 4, wherein
    the electronic control unit is configured to reduce the engine rotation speed when the driver performs an accelerator operation and a brake operation simultaneously, provided that a parameter which reflects the load on the motor and a battery is larger than a threshold.

7. A control apparatus for a hybrid vehicle including, as a drive power source, a hybrid system that has an engine and a motor, the control apparatus comprising
    an electronic control unit configured to perform output reduction control that reduces an output of the hybrid system by only changing a parameter other than a target engine rotation speed when a driver performs an accelerator operation and a brake operation simultaneously while the hybrid vehicle is in motion.

8. The control apparatus for a hybrid vehicle according to claim 7, wherein
    the parameter other than the target engine rotation speed includes a torque command value of the motor.

9. The control apparatus for a hybrid vehicle according to claim 7, wherein
    the electronic control unit is configured to also reduce the target engine rotation speed to reduce the output of the hybrid system when the driver performs an accelerator operation and a brake operation simultaneously, provided that the hybrid vehicle is not in a sport drive mode, in which an acceleration performance of the hybrid vehicle is enhanced beyond a drive mode other than the sport drive mode.

10. The control apparatus for a hybrid vehicle according to claim 7, wherein
    the electronic control unit is configured to also reduce the target engine rotation speed to reduce the output of the hybrid system when the driver performs an accelerator operation and a brake operation simultaneously, provided that a parameter which reflects the load on the motor and a battery is larger than a threshold.

* * * * *